(12) United States Patent
Jiang et al.

(10) Patent No.: US 9,205,365 B2
(45) Date of Patent: Dec. 8, 2015

(54) SORBENT ARTICLE FOR $CO_2$ CAPTURE

(71) Applicant: CORNING INCORPORATED, Corning, NY (US)

(72) Inventors: Dayue Jiang, Painted Post, NY (US); Zhen Song, Painted Post, NY (US); Jianguo Wang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 211 days.

(21) Appl. No.: 14/146,950

(22) Filed: Jan. 3, 2014

(65) Prior Publication Data
US 2014/0116250 A1      May 1, 2014

Related U.S. Application Data

(62) Division of application No. 13/111,360, filed on May 19, 2011, now Pat. No. 8,647,412.

(60) Provisional application No. 61/447,341, filed on Feb. 28, 2011.

(51) Int. Cl.
*B01D 53/02* (2006.01)
*B01J 20/28* (2006.01)
(Continued)

(52) U.S. Cl.
CPC ............... *B01D 53/04* (2013.01); *B01D 53/02* (2013.01); *B01J 20/103* (2013.01); *B01J 20/262* (2013.01); *B01J 20/28045* (2013.01); *B01J 20/28057* (2013.01); *B01J 20/28097* (2013.01); *B01J 20/3204* (2013.01); *B01J 20/327* (2013.01);
(Continued)

(58) Field of Classification Search
CPC ...................................................... B01J 20/262
See application file for complete search history.

(56) References Cited

U.S. PATENT DOCUMENTS 6,099,621 A    8/2000   Ho
6,547,854 B1   4/2003   Gray et al.
(Continued)

FOREIGN PATENT DOCUMENTS

CN    101500104    12/2011
CN    101909743    1/2013
(Continued)

OTHER PUBLICATIONS

Jason C Hicks et al; "Designing Adsorbents for CO2 Capture From Flue Gas-Hyperbranched Aminosilicates Capable of Capturing CO2 Reversibly"; J. Am. Chem. Soc. 2008, 130, 10, 2902-2903.
(Continued)

*Primary Examiner* — Duane Smith
*Assistant Examiner* — Cabrena Holecek
(74) *Attorney, Agent, or Firm* — Zachary J. Wegmann

(57) ABSTRACT

A sorbent article having a substrate having porous channel walls defining open channels, and an organic-inorganic hybrid sorbent material distributed on a surface of the porous channel walls, wherein the sorbent material is derived from an amino-functionalized alkoxysilane and a polyamine, wherein the sorbent material is present in an amount equal to or greater than 10 g/l, wherein at least some of the sorbent material resides in the porous channel walls and forms $CO_2$ adsorption sites within the interior of the porous channel walls. The article may be useful, for example, for removing $CO_2$ from a gas.

11 Claims, 2 Drawing Sheets

(51) Int. Cl.
  *B01D 53/04* (2006.01)
  *B01J 20/10* (2006.01)
  *B01J 20/26* (2006.01)
  *B01J 20/32* (2006.01)

(52) U.S. Cl.
  CPC ....... *B01J 20/3272* (2013.01); *B01D 2253/106* (2013.01); *B01D 2253/202* (2013.01); *B01D 2253/25* (2013.01); *B01D 2253/3425* (2013.01); *B01D 2257/504* (2013.01); *Y02C 10/08* (2013.01)

(56) References Cited

U.S. PATENT DOCUMENTS

| | | | |
|---|---|---|---|
| 6,908,497 B1 | 6/2005 | Sirwardane | |
| 7,288,136 B1 | 10/2007 | Gray et al. | |
| 2007/0022877 A1* | 2/2007 | Marand | B01D 53/228 95/51 |
| 2010/0212495 A1 | 8/2010 | Gadkaree et al. | |

FOREIGN PATENT DOCUMENTS

| | | |
|---|---|---|
| WO | 03095071 | 11/2003 |
| WO | 2005108297 | 11/2005 |

OTHER PUBLICATIONS

De Lathouder K M et al; "A Novel Structured Bioreactor; Development of a Monolithic Stirrer Reactor With Immobilized Lipase"; Catalysis Today; Elsevier, NL, vol. 105, No. 3-4, Aug. 15, 2005, pp. 443-447.

Leal O et al; "Recersible Absorption of Carbon Dioxide on Amine Surface-Bonded Silica Gel"; Inorganica Chimica Acta, 240, 1995, pp. 183-189.

De Lathouder et al; "Polyethyleneimine (PEI) Functionalized Ceramic Monoliths as Enzyme Carriers: Preparation and Performance"; Journal of Molecular Catalysis B: Enzymatic, 50, 2008, pp. 20-27.

Wang et al; "MFI Zeolite With Small and Uniform Intracrystal Mesopores"; Angewandte Chemie International Edition, vol. 45, No. 45, 2006 pp. 7603-7606.

International Search Report and Written Opinion, dated Aug. 14, 2012, pp. 1-20, International Application No. PCT/US2012/026291, European Patent Office, The Netherlands.

Chinese Office Action, dated Jan. 7, 2015, pp. 1-15, Chinese Application No. 201280010621.7, The State Intellectual Property Office of the People's Republic of China , China.

* cited by examiner

US 9,205,365 B2

SORBENT ARTICLE FOR CO$_2$ CAPTURE

CROSS-REFERENCE TO RELATED APPLICATIONS

This application is a divisional of U.S. patent application Ser. No. 13/111360 filed on May 19, 2011, the content of which is relied upon and incorporated herein by reference in its entirety, and the benefit of priority under 35 U.S.C. §120 is hereby claimed which claims the benefit of priority under 35 U.S.C. §119 of U.S. Provisional Application Ser. No. 61/447341 filed on Feb. 28, 2011 the content of which is relied upon and incorporated herein by reference in its entirety.

FIELD OF THE DISCLOSURE

This disclosure relates generally to sorbent articles comprising an organic-inorganic sorbent material derived from a functionalized alkoxysilanes and polyamines. The sorbent articles may be useful, for example, for removing CO$_2$ from a gas stream.

BACKGROUND

Many industrial processes, such as coal gasification, biomass gasification, steam reforming of hydrocarbons, partial oxidation of natural gas, and like processes, produce gas streams that include, for example, CO$_2$. There are major concerns that such CO$_2$ is responsible for the greenhouse effect. It is therefore desirable to remove or capture CO$_2$ from those gas mixtures.

SUMMARY

Disclosed herein is a sorbent article for removing CO$_2$ from a gas, the sorbent article comprising a substrate comprising porous channel walls defining open channels, and an organic-inorganic sorbent material distributed on a surface of the porous channel walls, wherein the sorbent material is derived from an amino-functionalized alkoxysilane and a silylated polyamine, wherein the wherein the sorbent material is present in an amount equal to or greater than 10 g/l, wherein at least some of the sorbent material resides in the porous channel walls and forms CO$_2$ sorption sites within the interior of the porous channel walls. Also disclosed herein is a sorbent article for removing CO$_2$ from a gas, the sorbent article comprising a substrate comprising porous channel walls defining open channels, and an organic-inorganic sorbent material distributed on a surface of the porous channel walls, wherein the sorbent material is derived from an epoxide-functionalized alkoxysilane and a polyamine, wherein the wherein the sorbent material is present in an amount equal to or greater than 10 g/l, wherein at least some of the sorbent material resides in the porous channel walls and forms CO$_2$ sorption sites within the interior of the porous channel walls. Also disclosed is a method of removing CO$_2$ from a fluid, the method comprising contacting the sorbent articles described above with a fluid stream comprising CO$_2$. The method may further comprise releasing at least a portion of sorbed CO$_2$ from the sorbent article. Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
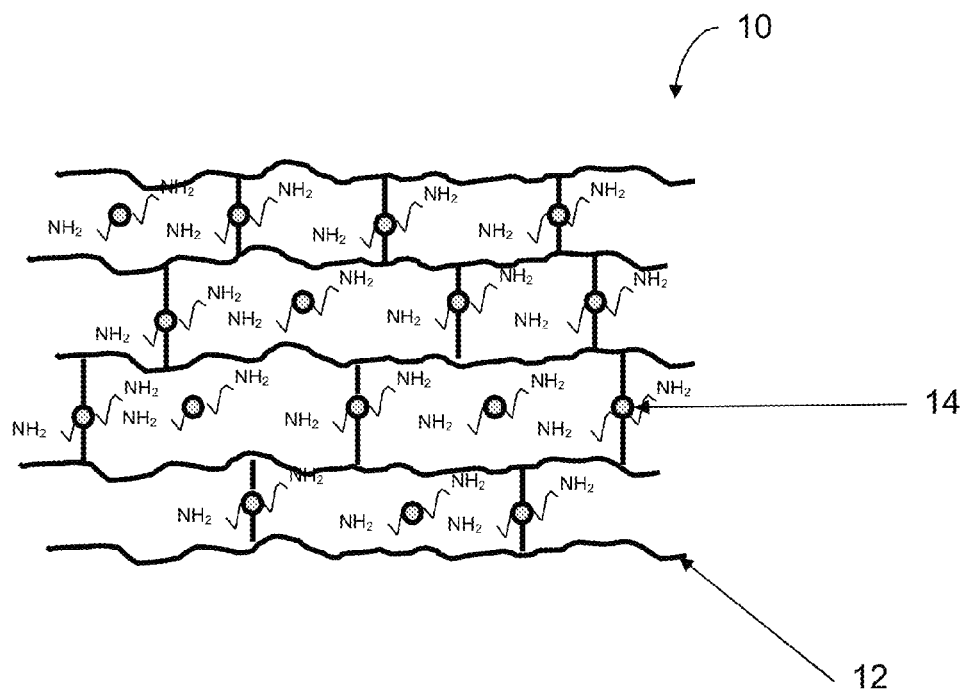
FIG. 1 is a schematic illustration of an embodiment of the organic-inorganic hybrid sorbent.

Disclosed herein is a sorbent article comprising a substrate comprising porous channel walls defining open channels, and an organic-inorganic hybrid sorbent material distributed on a surface of the porous channel walls, wherein the sorbent material is derived from an amino-functionalized alkoxysilane and a silylated polyamine, wherein the sorbent material is present in an amount equal to or greater than 10 g/l, wherein at least some of the sorbent material resides in the porous channel walls and forms CO$_2$ sorption sites within the interior of the porous channel walls. Also disclosed herein is a sorbent article for removing CO$_2$ from a gas, the sorbent article comprising a substrate comprising porous channel walls defining open channels, and an organic-inorganic sorbent material distributed on a surface of the porous channel walls, wherein the sorbent material is derived from an epoxide-functionalized alkoxysilane and a polyamine, wherein the wherein the sorbent material is present in an amount equal to or greater than 10 g/l, wherein at least some of the sorbent material resides in the porous channel walls and forms CO$_2$ sorption sites within the interior of the porous channel walls. The sorbent articles disclosed may be useful, for example, for removing CO$_2$ from a gas.

In embodiments, the organic-inorganic hybrid sorbent is a silylated polyamine. Organic-inorganic hybrid sorbents may comprise amino functionality, allowing them to be used to sorb gases such as CO$_2$. Embodiments of the organic-inorganic hybrid sorbents have a network of silylated polyamine polymers in which the inorganic moiety is attached to the organic polymer. The result is an organic-inorganic hybrid sorbent with uniform packing densities and microstructural homogeneity that is capable of effectively capturing CO$_2$ from a mixture of gases.

A sol comprising a silylated polyamine helps to form a sorbent with uniform density and microstructural homogeneity by polymerization of the silane moiety through a sol-gel process while the amino moiety provides a functional group for capturing CO$_2$. In embodiments, the methods disclosed herein provide an efficient and cost effective process for making the organic-inorganic hybrid sorbent.

The sol-gel process is a wet-chemical technique well known in the art. It begins with a chemical solution or suspension, the "sol," which acts as a precursor for an integrated network, or "gel" of network polymers. The sol has the monomeric units (i.e. the silylated polyamine) and may also have other desired components of the final gel either in solution or as a suspension of submicron particles. The sol-gel process is a dynamic process where polycondensation begins in the sol and proceeds to a gel point. At the gel point, the polymerization is so extensive that it cannot be poured. The sol is cast or deposited before the gel point and polycondensation continues to the gel point after the sol is cast or deposited, particularly as it begins to dry and the sol becomes concentrated. Polycondensation may continue past the gel point, creating a stiffer gel.

In some embodiments, a sol is prepared by adding the silylated polyamine to an aqueous solvent. The silylated polyamine may be a polyamine having at least one silane or alkoxysilane moiety attached anywhere within the polyamine. The polyamine may be a homopolymer or it may be a heteropolymer. A heteropolymer may have different amine units or it may have a combination of amino and other moieties such as a poly(amino-alcohol). In the sol, the silane moiety of the silylated polyamine undergoes hydrolysis and is partially or fully hydroxylated. If the silane moiety is an alkoxy silane, the alkoxy groups may be replaced by a hydroxyl moiety. In one exemplary embodiment, the silane moiety is a trialkoxysilane and with hydrolysis at least one of alkyloxy groups of the trialkoxysilane replaced with a hydroxyl group. The hydroxyl group can then react with either another hydroxyl moiety or an alkoxy moiety in a second silylated polyamine through a polycondensation reaction. A silica particle/core 14 is formed as the reaction continues (see FIG. 1), creating a polymer network and ultimately a gel. The silica core 14 along with the polyamine 12 form the organic-inorganic hybrid sorbent 10.

In one embodiment there is provided a method for making an organic-inorganic hybrid sorbent. The method may comprise the steps of preparing a sol comprising at least one silylated polyamine and an aqueous solvent, casting the sol onto a surface and drying the sol to form the organic-inorganic hybrid sorbent. The silylated polyamine may function both as the precursor to the silica core as well as the functional polymer where the amino-moieties sorb the $CO_2$. The silylated polyamine may be, but is not limited to, silylated polyethylenimine (SPEIm), silylated polyvinylpyridine, silylated polydimethylaminoethylmethacrylate, silyated polyvinylamine, silylated polyallylamine (PAAm) or combinations thereof. In an illustrative embodiment, the silylated polyamine is trimethoxysilylpropyl modified polyethylenimine, silylated polyethylenimine. The sol may comprise from about 5 wt % to about 40 wt % (or higher) of the silylated polyamine. In an embodiment, the sol may comprise from about 10 wt % to about 20 wt % of the silylated polyamine. It is well known in making sol solutions that the concentration of the silylated polyamine may be such so that the sol does not begin to gel before being cast or deposited on a substrate. The working time for a sol will depend on the silylated polyamine being used as well as concentration and temperature. Those skilled in that art will be able to determine the best concentration for forming a gel from a sol without undue experimentation.

Likewise, the choice of aqueous solvent may be dependent on the silylated polyamine(s) comprising the sol. By way of non-limiting example, SPEIm may be in aqueous isopropanol. The aqueous solvent may be chosen based on the solubility characteristics of the desired silylated polyamines. Other examples of aqueous solvents may be short alkyl chain alcohols such as methanol and ethanol, either alone or in combination with water.

In some embodiments, the silylated polyamine is prepared via an in-situ silylating process before preparing the sol, and subsequently the organic-inorganic hybrid sorbent. The polyamine may be in-situ silylated in an aqueous system through a reaction with a silane, for example, glycidylpropyltrimethoxysilane (GPTMOS). In some embodiments, more than one silane may be used. Polyamines suitable for in-situ silylation include, for example, polyethylenimine, polyallylamine, and polyvinylamine.

The sol can be either cast onto a surface (e.g., by dip-coating or spin-coating), formed into a shaped body, or used to synthesize powders, microspheres, or nanospheres. In one embodiment, the sol is cast on a substrate to produce an organic-inorganic hybrid sorbent article. The substrate may be, but is not limited to, a ceramic honeycomb substrate. In another embodiment, the sol is formed into a shaped body, for example a honeycomb substrate. In yet another embodiment, the dried sol is used to obtain a powdered sorbent. Once the sol is cast on the desired surface and/or substrate, the sol and/or subsequent resulting gel may be dried removing the remaining liquid (solvent). As described above, the sol-gel process is a dynamic process and drying the sol may hasten the onset of the gel point.

In embodiments, the sol, and subsequently the organic-inorganic hybrid sorbent, may further have at least one hydrophilic polymer. The sol may have from about 5 wt % to about 25 wt % of the hydrophilic polymer where the hydrophilic polymer is an alcohol-based polymer or an amino-functionalized alcohol polymer. Non-limiting examples of alcohol-based polymers may be poly(vinyl alcohol) (PVA) or poly(allyl alcohol) (PAA), poly(hydroxyethyl methacrylate) (PHEMa) or combinations thereof. Non-limiting examples of the amino-functionalized alcohol polymer may be poly(vinyl alcohol-co-vinylamine) (PVAAm), poly(vinyl alcohol-co-allylamine) (PVAAAm), poly(aminoprolyl methacrylamide-co-hydroxyethyl methacrylate) (PAPMa-co-HEMa) or combinations thereof. The hydrophilic polymer may be distributed throughout the gel as it is formed and subsequently, the organic-inorganic hybrid composition membrane. It may interact with the silylated polyamine through ionic bonding, hydrogen bonding or by Vander Waal forces. However, it is not necessary that the hydrophilic polymer interact with the silylated polyamine. Optionally, the hydrophilic polymer may be crosslinked to the polyamine either chemically, by radiation or UV, or thermally. It may be crosslinked in the sol or after the gel is formed. If the hydrophilic polymer is an amino-functionalized alcohol polymer, it may provide additional amine functionality for sorbing $CO_2$.

In embodiments, the sol, and subsequently the organic-inorganic hybrid sorbent, may also have at least one alkoxysilane. In illustrative embodiments, the alkoxysilane may be an amine-functionalized alkoxysilane such as, but not limited to, aminopropyltriethoxysilane (APTEOS), (3-trimethoxysilylpropyl)diethylenetriamine (TMSPDETA), glycidylpropyltrimethoxysilane (GPTMOS), N-(2-aminoethyl)-3-aminopropyltrimethoxysilane, N-(2-aminoethyl)-3-aminoisobutylmethyldimethoxysilane, or combinations thereof. The amine-functionalized alkoxysilanes can form amino-functionalized silica particles through the formation of a silica core as described above for the silylated polyamine. The alkoxysilanes along with the silylated polyamines may form a heterogeneous silica core having both compounds. In some embodiments, non-amino-functionalized silanes/siloxanes may be used, for example, epoxide-functionalized alkoxysilanes may be used.

The organic-inorganic hybrid sorbent may be disposed on a substrate using a suitable technique such as by applying a solution of the organic-inorganic hybrid sorbent to the substrate. As examples, the organic-inorganic hybrid sorbent can be applied by dipping the substrate in a solution comprising the organic-inorganic hybrid sorbent, by pouring the solution comprising the organic-inorganic hybrid sorbent on the substrate, or by spraying a solution comprising the organic-inorganic hybrid sorbent on the substrate.

The eventual quantity of organic-inorganic hybrid sorbent formed on the flow-through substrate is dependent on the amount of organic-inorganic hybrid sorbent that is retained by the substrate. The amount of organic-inorganic hybrid sorbent retained by the substrate can be increased e.g., by contacting the substrate with the organic-inorganic hybrid sorbent more than once and allowing the substrate to dry between contacting steps. In addition, the amount of organic-inorganic hybrid sorbent retained by the substrate can be controlled by simply modifying the overall porosity of the substrate (e.g., increasing porosity will increase the amount of organic-inorganic hybrid sorbent retained by the substrate). In some embodiments, the amount of organic-inorganic hybrid sorbent disposed on the flow-through substrate results in greater than 10 g/l sorbent loading, greater than 25 g/l sorbent loading, greater than 50 g/l sorbent loading, greater than 75 g/l sorbent loading, greater than 100 g/l sorbent loading, greater than 200 g/l sorbent loading, greater than 300 g/l sorbent loading, greater than 400 g/l sorbent loading, or greater than 500 g/l sorbent loading.

In some embodiments, the organic-inorganic hybrid sorbent is distributed on a surface of the porous channel walls of a substrate. For example, the organic-inorganic hybrid sorbent may be distributed on all or a portion of the exposed surfaces of the porous channel walls. In embodiments where the porous channel walls comprise combinations of pore sizes and porous networks throughout the porous channel walls, the organic-inorganic hybrid sorbent may impregnate the porous channel walls of the substrate to any extent. In some embodiments, the organic-inorganic hybrid sorbent is distributed on the surfaces of the porous channel wall and any outer surfaces of the substrate. In some embodiments, the organic-inorganic hybrid sorbent is in the form of an uninterrupted and continuous coating over all or a portion of the surfaces of the substrate. In other embodiments, the organic-inorganic hybrid sorbent comprises cracks, pinholes, or other discontinuities. In some embodiments, the organic-inorganic hybrid sorbent is distributed on the surface of the porous channel walls in a particle form. In embodiments, there is minimal blockage of pores by the organic-inorganic hybrid sorbent.

In some embodiments, at least a portion of the organic-inorganic hybrid sorbent is chemically bound to at least a portion of flow-through substrate. Thus, in these embodiments, some or all of the organic-inorganic hybrid sorbent can be chemically bound to some or all of the flow-through substrate.

In some embodiments, at least a portion of the organic-inorganic hybrid sorbent is mechanically bound to at least a portion of flow-through substrate. Thus, in these embodiments, some or all of the organic-inorganic hybrid sorbent can be mechanically bound to some or all of the flow-through substrate.

In some embodiments, the substrate comprises a glass, glass-ceramic, ceramic, or combinations thereof. Some example substrate materials include cordierite, mullite, clay, magnesia, metal oxides, talc, zircon, zirconia, zirconates, zirconia-spinel, spinel, zeolite, alumina, alumina-titanate, titania, alumino-silicates, silica, silicates, magnesium alumino-silicates, borides, feldspar, fused silica, nitrides, carbides, silicon nitride, metal sulfates, metal carbonates, metal phosphates, or combinations of these.

In some embodiments, the porous channel walls of the substrate have a surface porosity of greater than 60%, greater than 65%, greater than 70%, or greater than 75%. In some embodiments, the porous walls of the substrate have a surface area of 100 m$^2$/g or more, 150 m$^2$/g or more, 200 m$^2$/g or more, or 250 m$^2$/g or more. In some embodiments, the porous channel walls have pore sizes greater than 10 microns, greater than 25 microns, greater than 50 microns, greater than 75 microns, greater than 100 microns, greater than 125 microns, greater than 150 microns, greater than 200 microns, greater than 500 microns, or combination thereof. In some embodiments, combinations of high porosity and large pores sizes allow for greater sorbent material loading, for example greater amounts of sorbent materials deposition within the pore structure of the porous channel walls.

In some embodiments, the substrate has a honeycomb structure comprising an inlet end, an outlet end, and open channels (also referred to as cells) extending from the inlet end to the outlet end. In some embodiments, the honeycomb comprises a multiplicity of channels extending from the inlet end to the outlet end, the channels being defined by intersecting channel walls.

The substrate may be made using suitable techniques, for example, the substrate may be made by extrusion.

A sorbent article as disclosed, including any of the embodiments described herein, may be used, for example, for the removal of $CO_2$ from a gas through contact with the gas. For example, a gas stream may be passed through open channels of a substrate, having an organic-inorganic hybrid sorbent distributed thereon, from the inlet end to the outlet end.

The terms "sorb," "sorption," and "sorbed," refer to the adsorption, sorption, or other entrapment of the $CO_2$ on the sorbent article, either physically, chemically, or both physically and chemically.

In some embodiments, the $CO_2$ sorption occurs at a temperature up to 30° C., 40° C., 50° C., 60° C., or 70° C.

The $CO_2$ removal from a gas may further include the step of releasing the $CO_2$ from the organic-inorganic hybrid sorbent article. For example at least a portion of sorbed $CO_2$ is desorbed from the sorbent article by providing the article having $CO_2$ sorbed thereon, and heating it to a temperature above the desorption temperature of the $CO_2$. Desorbing of the sorbed $CO_2$ may also be referred to as regeneration of the sorbent article. The sorbent article may be heated using a suitable method. For example, in one embodiment, the sorbent article may be heated by a flow of hot inert gas such as nitrogen.

A sufficient temperature to desorb the $CO_2$ will depend, in part, on the amount of $CO_2$ that is present. In one embodiment, a sufficient temperature can comprise heating the article at a temperature in the range of from 50° C. to 300° C., including, for example, temperatures of 100° C., 150° C., 180° C., or 200° C. In another embodiment, the sufficient heating temperature can be in a range derived from these values, including for example, a range from 90° C. to 200° C., or 90° C. to 180° C.

In some embodiments, a sorbent article is capable of more than one cycle of sorption and desorption of $CO_2$. For example, the sorbent article may be used for $CO_2$ removal from a gas and regenerated to remove the sorbed $CO_2$, the article may then be used again for $CO_2$ removal from a gas. In some embodiments, the sorbent article may be capable of 2 or more, 5 or more, 10 or more, 50 or more, or 100 or more cycles of sorption and desorption of $CO_2$.

Various embodiments will be further clarified by the following examples.

EXAMPLES 1-3

In a vial, an amount of a chemical was charged and then an amount of water was added and this was mixed well, for example, 5.0 g APTEOS and 5.0 g water was mixed well and a 50% aqueous solution was obtained. Three solutions were prepared as shown in Table 1.

TABLE 1

| Chemical | Description |
|---|---|
| APTEOS | Prepared into aqueous solution by adding water (a 50% solution was prepared) |
| SPEI | Prepared into a water/isopropanol solution by adding water (a 25% solution was prepared) |
| APTEOS/SPEI | Prepared into water/isopropanol solution by adding water (a 37.5 solution with APTEOS:SPEI isopropanol solution at 1:1, wt/wt was prepared |

Glass wool paper was used as a substrate for examples 1-3. The substrate (its mass was measured before applying the sorbent) was submerged into a solution for 10-15 seconds and then dried at room temperature from hours to overnight (its mass was measured again). The weight gain (the percentage of the solid sorbent with moisture) was obtained by the mass difference (the percent weight gain was about 65% for the tested samples).

Figure 2:
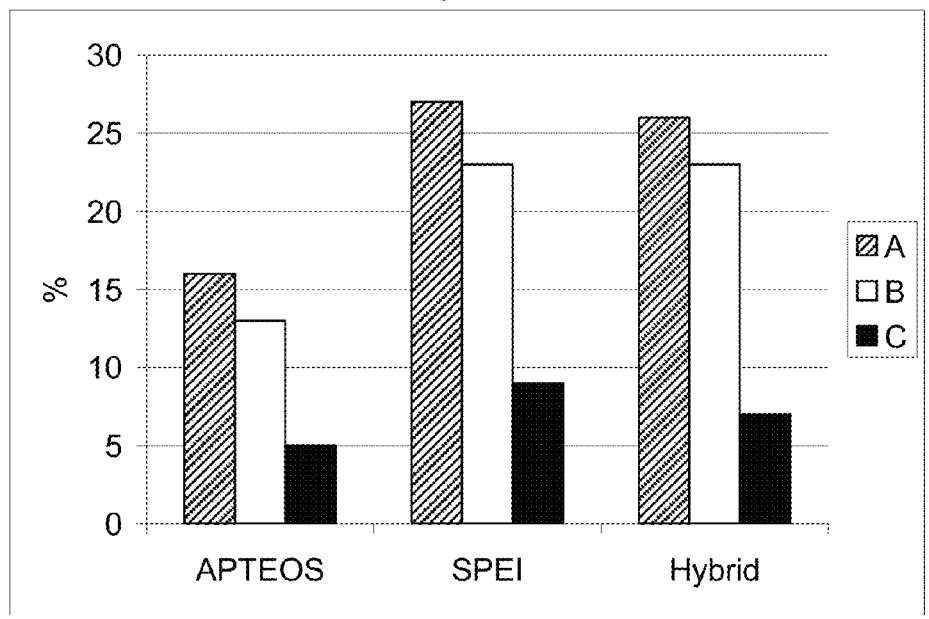
FIG. 2 shows CO$_2$ adsorption and desorption according to an embodiment disclosed herein.

Capability of capturing $CO_2$ for the resulting samples was conducted in a moisturized $CO_2$ atmosphere with a small amount of back pressure). Results about the sorption A, desorption B and estimated moisture C capturing for the $1^{st}$ cycle are listed in Table 2 and plotted in FIG. 2.

TABLE 2

| Tested sample (sorbent attached glass wool paper with sorbent at ~65 wt %) | % sorption (weight gain) | % Desorption (weight loss) | % Moisture (estimated) |
|---|---|---|---|
| Amine-functionalized silica (from APTEOS) | 16.5 | 12.7 | 5 |
| Silica attached PEI (from SPEI) | 27.1 | 23.1 | 9 |
| Silica/PEI hybrid (from mixture of APTEOS/SPEI) | 25.5 | 23.1 | 7 |

The sorption was obtained at room temperature for 30-45 minutes with a small back pressure using dry ice as the $CO_2$ source and the $CO_2$ gas was passed through a water bath to obtain the moisture; a control test was conducted in a humidified air atmosphere (containing both $N_2$ and $O_2$) at the same condition. Just before the test, the testing sample (room temperature dried for over night) was further dried in an oven with a forced air at 100° C. for 15 minutes.

The desorption was achieved at 100° C. for 15 minutes in an oven with forced air.

Moisture is included in the sorption and desorption data, the difference between the sorption and the moisture estimated is used to estimate the $CO_2$ captured and the difference between the desorption and the moisture estimated is used to estimate the $CO_2$ released. The moisture was estimated three ways: 1) the mass difference between the mass after the room temperature dried sample (overnight drying) and the mass after the oven dried sample (100° C. for 15 minutes under a forced air) before the sample was tested; 2) the mass difference between the mass just releasing the $CO_2$ at 100° C. for 15 minutes and the mass obtained after placing the sample in hood for over night at room temperature; and 3) the mass difference from the control test—between the mass after dried at 100° C. for 15 minutes and the mass after the control test (with the same condition as the $CO_2$ capturing test except using air to replace $CO_2$) and then dried at room temperature for overnight.

Figure 3:
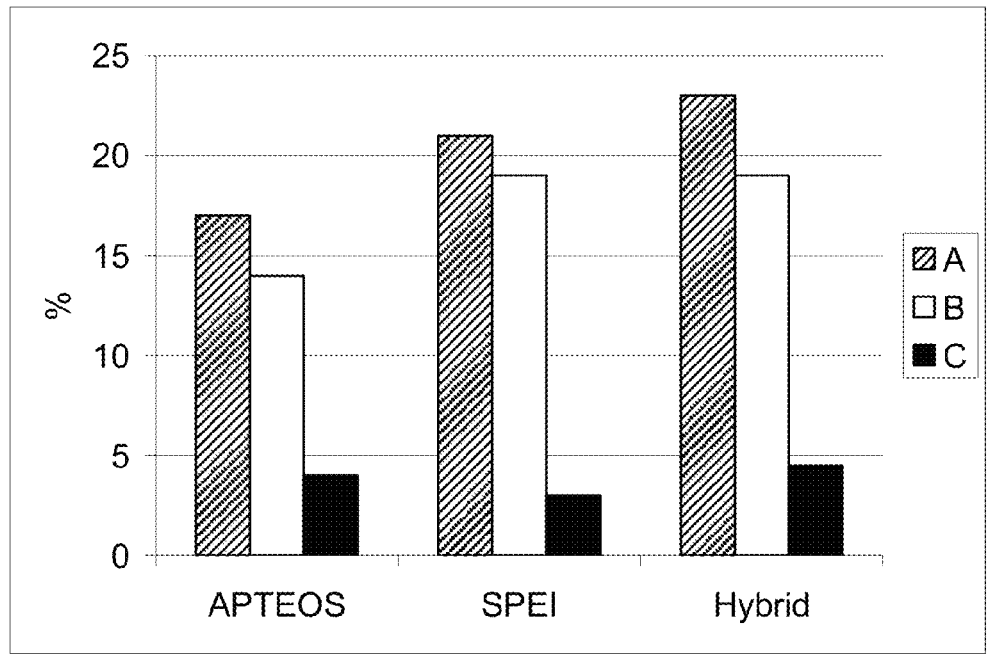
FIG. 3 shows CO$_2$ adsorption and desorption according to an embodiment disclosed herein.

The three samples tested in the first cycle were tested for a second cycle and the sorption A, desorption B, and estimated moisture C are plotted in FIG. 3.

The thermal stability and antioxidation performance was evaluated by the color change through heating samples in an oven at 100° C. with forced air. Samples that changed color (from colorless to light brown and dark brown) at the earliest time were considered to have poor thermal stability and antioxidation performance.

The amino-functionalized silica particle (from the APTEOS) possesses a good thermal stability and antioxidation performance according to the thermal test, but shows the lowest sorption capability because of a relative low amount of amino-groups. The silica attached PEI possesses a good capability of capturing the $CO_2$, but the thermal stability and antioxidation performance is undesirable. The silica/PEI hybrid derived from APTEOS/SPEI combines the advantages of the two materials and demonstrates a capability of capturing $CO_2$ close to the silica attached PEI and the thermal stability and anti-oxidation performance close to the amino-functionalized silica.

EXAMPLE 4

A silica/PEI hybrid sorbent solution as prepared above was distributed on a high porosity honeycomb substrate. The amount of solid sorbent material on the substrate was about 10 weight percent. $CO_2$ capture capability of the sample was tested using a gas stream of 9.2% $CO_2$, 5.5% $H_2O$, and balance $N_2$. Adsorption was tested at room temperature. Four cycles of different adsorption time were measured, from 10 minutes to 20 minutes. No water adsorption peak was detected, but a water desorption curve was observed at temperature less than 100° C. The $CO_2$ capture capacity was stable over the 4 cycles. $CO_2$ adsorption occurs within 3 minutes. An increase in sample temperature was observed during adsorption. The $CO_2$ capture efficiency of this sample was about 35%.

Figure 4:
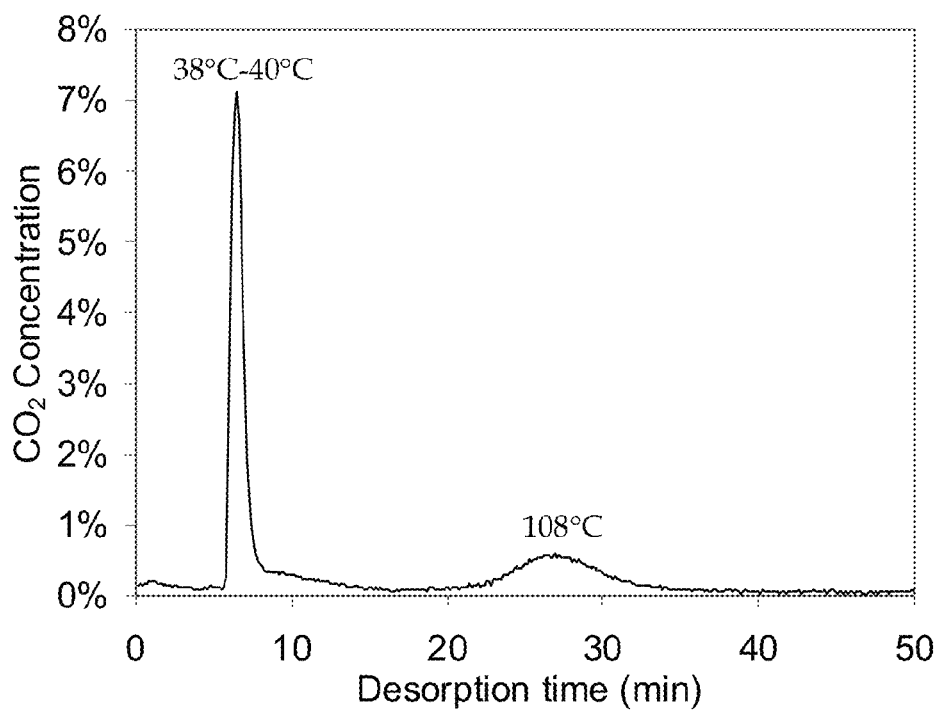
FIG. 4 shows desorption peaks of CO$_2$ according to an embodiment disclosed herein.

The sample was then heated to 120° C. to desorb the $CO_2$. Two desorption peaks were observed, as shown in FIG. 4. One peak at about 38° C. to 40° C., represents physiosorbed $CO_2$. The second peak at about 108° C. represents chemisorbed $CO_2$. The amount of physiosorbed to chemisorbed $CO_2$ ratio is about 6:1.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A sorbent article for removing $CO_2$ from a gas, the article comprising:
   a substrate comprising porous channel walls defining open channels; and
   an organic-inorganic hybrid sorbent material distributed on a surface of the porous channel walls;
   wherein the sorbent material is derived from an epoxide-functionalized alkoxysilane and a polyamine;
   wherein the sorbent material is present in an amount equal to or greater than 10 g/l;
   wherein at least some of the sorbent material resides in the porous channel walls and forms $CO_2$ adsorption sites within the interior of the porous channel walls; and
   wherein the organic-inorganic sorbent material has microstructural homogeneity.

2. The article of claim 1, wherein the polyamine is a silylated polyamine.

3. The article of claim 1, wherein the polyamine is a non-silylated polyamine.

4. The article of claim 3, wherein the sorbent material is derived from an epoxide-functionalized alkoxysilane and a non-silylated polyamine in the presence of an amino-functionalized alkoxysilane.

5. The article of claim 1, wherein the sorbent material comprises an SPEI-silica material.

6. The article of claim 1, wherein the substrate is honeycomb shaped.

7. The article of claim 1, wherein the porosity of the channel walls is greater than 60%.

8. The article of claim 1, wherein the sorbent material is capable of capturing $CO_2$ at one temperature and releasing the $CO_2$ at a higher temperature.

9. A method of removing $CO_2$ from a fluid, the method comprising: contacting an article of claim 1 with a fluid stream comprising $CO_2$.

10. The method of claim 9, further comprising releasing at least a portion of sorbed $CO_2$ from the article.

11. The article of claim 1, wherein the sorbent material is dispersed in a liquid.

* * * * *